United States Patent [19]

Langen et al.

[11] Patent Number: 5,707,227
[45] Date of Patent: Jan. 13, 1998

[54] BURNER OF A VEHICLE HEATER

[75] Inventors: Herbert Langen, Altbach; Fritz Mohring, Ostfildern; Stefan Ottenbacher, Pliezhausen; Wolfgang Schaffert, Aichwald, all of Germany

[73] Assignee: J. Eberspächer GmbH & Co., Esslingen, Germany

[21] Appl. No.: 564,334

[22] PCT Filed: Aug. 25, 1994

[86] PCT No.: PCT/EP94/02812

§ 371 Date: Dec. 1, 1995

§ 102(e) Date: Dec. 1, 1995

[87] PCT Pub. No.: WO95/06223

PCT Pub. Date: Mar. 2, 1995

[30] Foreign Application Priority Data

Aug. 26, 1993 [DE] Germany .................. 43 28 789.1

[51] Int. Cl.$^6$ ........................................... F23Q 3/00
[52] U.S. Cl. .................. 431/261; 431/329; 237/12.3 C
[58] Field of Search ........................... 431/261, 329, 431/328; 237/12.3 R, 12.3 B, 12.3 C; 126/110 C, 110 B, 116 R, 110 D

[56] References Cited

U.S. PATENT DOCUMENTS

| 4,530,658 | 7/1985 | Panick | 431/329 |
| 4,632,306 | 12/1986 | Bleeker et al. | 237/12.3 C |
| 4,818,219 | 4/1989 | Widemann et al. | 431/261 |
| 5,082,175 | 1/1992 | Koch et al. | 237/12.3 C |

FOREIGN PATENT DOCUMENTS

| 3403972C2 | 5/1987 | Germany . |
| 3713460C2 | 1/1991 | Germany . |

*Primary Examiner*—Larry Jones
*Attorney, Agent, or Firm*—McGlew and Tuttle

[57] ABSTRACT

The invention pertains to a burner of a vehicle heater which includes a blower for supplying the combustion air, a combustion chamber having a lining which is porous at least in some areas on part of its inner surface, a means for supplying fuel to the porous area of the lining and an electric glow plug for igniting the fuel or fuel-air mixture evaporated from the lining.

20 Claims, 2 Drawing Sheets

BURNER OF A VEHICLE HEATER

FIELD OF THE INVENTION

The present invention pertains to a burner of a vehicle heater and in particular to a burner where liquid fuel is evaporated by a porous lining in a combustion chamber and a glow plug ignites the fuel.

BACKGROUND OF THE INVENTION

The ignition of the fuel in a combustion chamber causes very harsh and adverse conditions which can cause a glow plug to deteriorate. Also byproducts of combustion can accumulate on a glow plug causing fouling and blocking the glow plug from igniting the fuel. In the combustion chamber conditions progresses from being almost completely full of liquid fuel, to varying fuel air mixtures, to partial combustion, to full combustion and then to full exhaust. The position of the glow plug is therefore of very great significance for ignition in such burners to avoid deterioration and fouling of the glow plug and still ignite the fuel or fuel-air mixture.

SUMMARY AND OBJECTS OF THE INVENTION

The basic object of the present invention is to design the burner such that favorable conditions are created for the ignition, on the one hand, and, on the other hand, the glow plug is protected from adverse effects caused by the conditions prevailing in the combustion chamber, especially concerning the exposure to flame and dirt accumulation.

To accomplish this object, the burner is characterized according to the present invention in that an end area of the combustion chamber, which is opposite the discharge of the hot gas, is provided with an essentially cylindrical wall and a combustion chamber bottom. A lining is provided for the bottom of the combustion chamber and the lining is also provided for at least an adjoining part of the length of a wall of the combustion chamber. A glow area of the glow plug is arranged in a recessed space of the lining, wherein the recessed space is in connection with the interior of the combustion chamber via an open passage.

Due to the fact that the glow area of the glow plug is positioned in a recessed space of the lining, a ready-to-ignite fuel-air mixture is formed in the immediate vicinity of the glow area due to the evaporation of fuel. Since the glow area of the glow plug is not located simply freely in the interior of the combustion chamber, it is spared the direct exposure to the adverse effects of the aforementioned type from the interior of the combustion chamber. In addition, the burner can be manufactured in an especially favorable manner concerning the environment of the glow plug.

The open passage between the recessed space and the interior of the combustion chamber shall be large enough for the ignition of the fuel-air mixture to be able to readily propagate into the interior of the combustion chamber. On the other hand, the passage should not be too large, in order to achieve a protective sealing of the recessed space in the intended manner. The open passage preferably has a cross-section area of 0.5% to 10% and preferably 1% to 5% of the area of the bottom of the combustion chamber to achieve these goals.

Especially favorable conditions are obtained concerning the manufacture and the position of the glow area of the glow plug if the glow plug is arranged essentially in a tangential direction in relation to the wall of the combustion chamber. However, this is only a preferred manner of arrangement; other arrangements are also possible, without therefore being less desirable in achieving the object.

The lining preferably has a combustion chamber bottom lining part and an essentially cylindrical combustion chamber wall lining part joining it with a front surface. Metal netting or metal fabric is an especially suitable material for the combustion chamber bottom lining part and ceramic is an especially suitable material for the combustion chamber wall lining part. The recessed space can be prepared especially favorably by not mating the combustion chamber bottom lining part completely in a disk-shaped manner, but making it, compared with this, without lining material in a limited area of the disk. This omission of material appears best from the edge of the combustion chamber bottom lining part. However, it is also possible to omit material of the combustion chamber wall lining part instead of or in addition to this.

The open passage, viewed in the axial direction of the end area of the combustion chamber, is preferably essentially segment-shaped. This is especially well adapted to the geometric conditions of the end area of the combustion chamber, and it makes possible an especially favorable manufacture.

A sheathed element glow plug, which is sometimes also called a rod plug, is preferably provided. Unlike the conventional glow plugs, sheathed element glow plugs have a sheathed spiral filament. The essentially cylindrical glow plug, which is rounded at its free ends, consists of a ceramic or metallic material. The sheathed element glow plug reaches high temperatures very rapidly and is less sensitive. In addition, the power consumption per ignition process is lower.

The burner according to the present invention is intended for use in vehicle heaters, especially vehicle heaters for installation in passenger cars, trucks, ships, campers, trailer-type recreational vehicles, bulldozers, etc. In the case of installation of the vehicle heaters in motor vehicles driven by internal combustion engines, the heater can be connected into the liquid circuit, which is usually provided for cooling the internal combustion engine and for heating the interior space of the vehicle. In general, the vehicle heater may be either a so-called water heater, which releases the heat generated onto a liquid circuit, or a so-called air heater, which releases the heat generated directly as a warm air flow. Gasoline or diesel fuel is primarily used as the fuel.

The burner according to the present invention may also be used as a heat generator for the thermal regeneration of particle filters, especially in the exhaust gas pipes of diesel engines.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
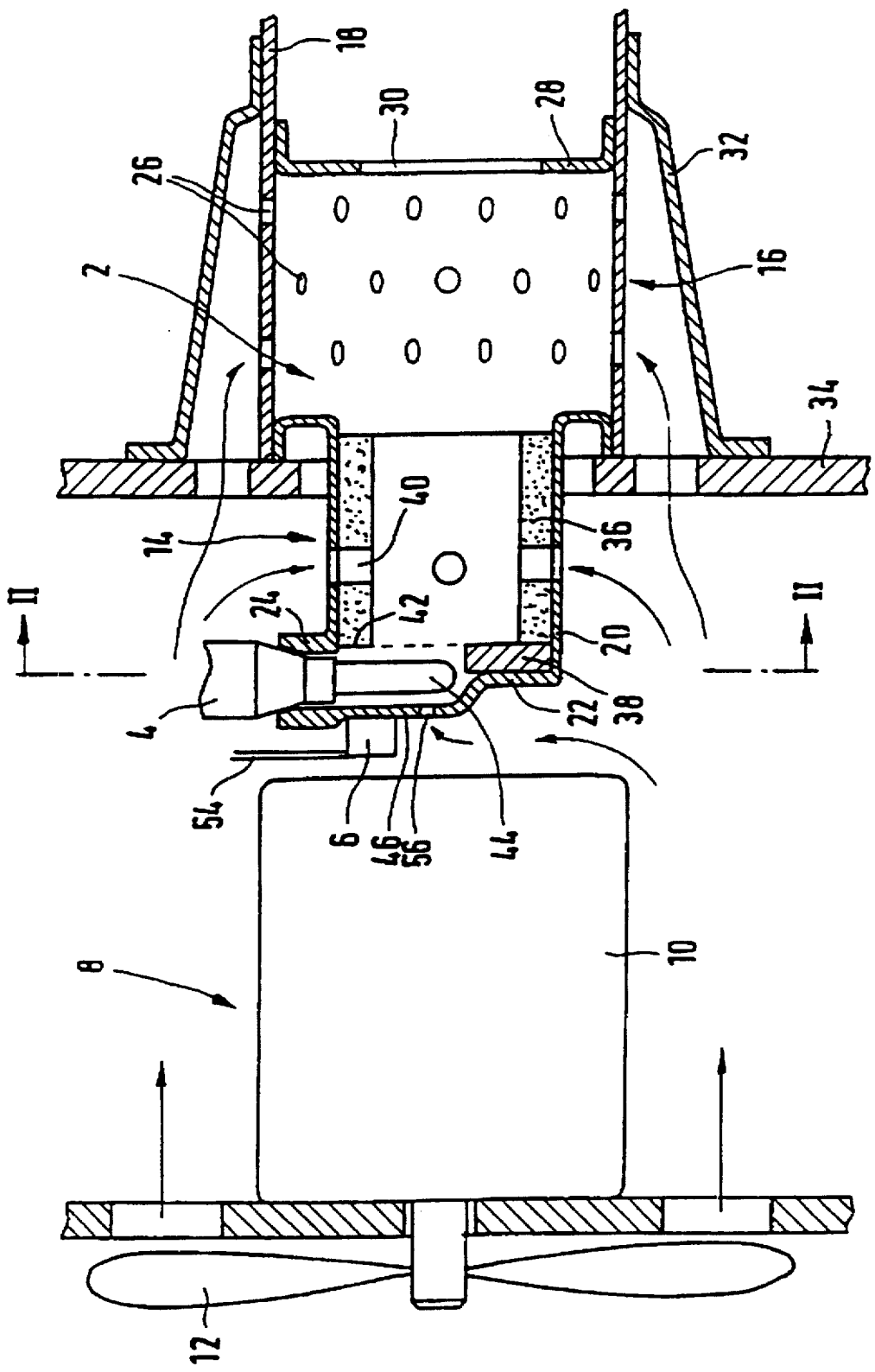
FIG. 1 shows a vertical longitudinal section along I—I in FIG. 2 of the burner area of a vehicle heater.

Referring to the drawings, and in particular to FIG. 1 which shows the burner area of a vehicle heater, a combustion chamber 2 is provided with a glow plug 4 and with a fuel supply means 6, which will be described below, as well as a combustion air blower 8. The housing of the heater is not shown for clarity's sake. In addition, the heater according to FIG. 1 can contain a heat exchanger which would join the combustion chamber 2 on the right of FIG. 1 and transmit heat from hot combustion gases to a liquid or air.

The combustion air blower comprises an electric motor 10 and a blower impeller 12, which is shown schematically in FIG. 1. Side channel blowers, which have a stationary channel and a blower impeller rotating at a short distance therefrom, are frequently used in practice.

The combustion chamber consists essentially of an end area 14, which is the left end area in FIG. 1, and a main combustion area 16 joining it to the right in FIG. 1. This is joined, to the right in FIG. 1, by a flame tube 18, in which the combustion of the fuel takes place completely. The end area 14 of the combustion chamber 2 has a cylindrical combustion chamber wall 20 and, to the left in FIG. 1, a closing combustion chamber bottom or end wall 22, which is essentially disk-shaped, except for a bulge, which will be described below. A socket 24 provided with internal threads is provided at the passage from the combustion chamber wall 20 to the combustion chamber bottom or end wall 22.

The main combustion area 16 of the combustion chamber 2 is cylindrical and coaxial to the end area 14 described. The main combustion area 16 has a larger diameter than the end area 14. The wall of the main combustion area 16 has, axially one behind the other, a plurality of circumferential rows of openings 26, through which combustion air flows into the main combustion area 16 from the outside. In the right-hand part of FIG. 1, the main combustion area 16 is closed by a transversely extending flame diaphragm 28, which has a large, central passage opening 30 for the hot gas flowing out. The combustion chamber arrangement is fastened to a transverse wall 34 of the heater by means of a funnel-shaped or cylindrical component 32.

A cylindrical combustion chamber wall lining material 36, consisting of ceramic material, is arranged on the inside of the cylindrical combustion chamber wall 20 of the end area 14 of the combustion chamber 2. A combustion chamber bottom lining part 38, which is disk-shaped, except for an area in which the material is omitted and which will be described below, is provided on the inside on the combustion chamber bottom 22. The front side or end surface 42 of the combustion chamber lining part 36, which is the left-hand front side in FIG. 1, is in contact with the combustion chamber bottom lining part 38. A plurality of radial openings 40 are provided in the combustion chamber wall 20 and in the combustion chamber wall lining part 36 to enable combustion air to flow in. The combustion chamber bottom lining part 38 consists of metal netting in the exemplary embodiment described.

Figure 2:
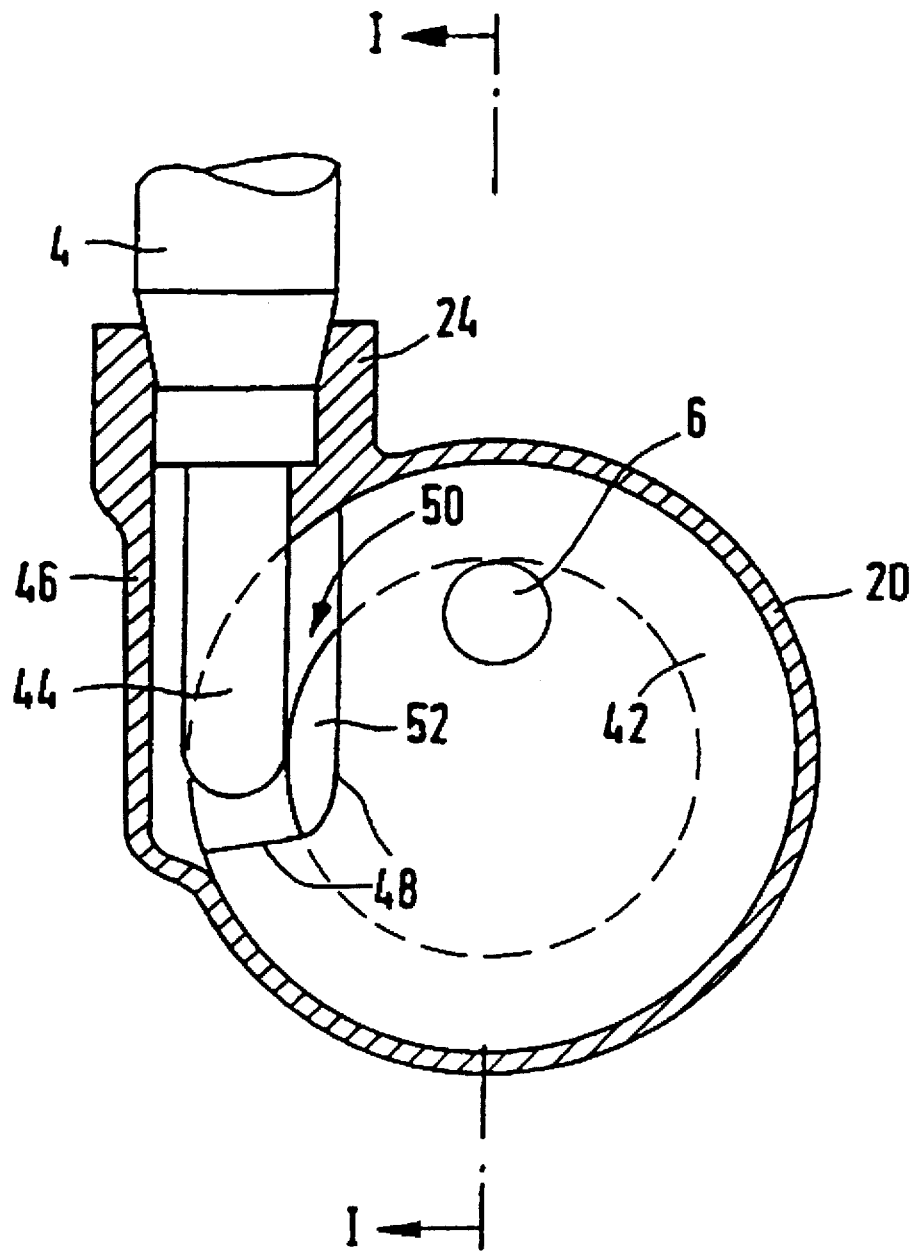
FIG. 2 shows a cross section along II—II in FIG. 1 of the area of the burner where the glow plug is positioned.

FIG. 2 shows that the glow plug 4 is positioned with its longitudinal axis in a tangential direction in relation to the combustion chamber wall 20. As an alternative, it would be possible to arrange the glow plug 4 radially or to position it obliquely at any desired angle between the tangential and radial arrangements. The longitudinal axis of the glow plug 4 is vertical in the exemplary embodiment shown. As an alternative, it would be possible to arrange the glow plug 4 at another point of the combustion chamber wall 20, extending tangentially, which can be illustrated by rotating the glow plug 4 around the central longitudinal axis of the combustion chamber 2.

Concerning "farther out" (i.e., to the left in FIG. 2) and "farther in" (to the right in FIG. 2), the glow plug 4 is arranged in the exemplary embodiment shown such that it is located exactly in front of the front side 42 of the combustion chamber wall lining part 36. As an alternative, it would be possible to move the glow plug 4 farther to the right in FIG. 2, so that a small part of its glow area 44 would project to the inside over the inner circumference of the combustion chamber wall lining part 36. According to another alternative, the glow plug 4 may also be shifted somewhat farther than shown to the left in FIG. 2, so that there is a certain distance between the inner circumference of the combustion chamber wall lining part 36 and the glow area 44 of the glow plug 4.

Concerning the positioning of the glow plug 4 regarding the axial direction of the combustion chamber 2, which can be recognized from FIG. 1, the glow area 44 has a short axial distance from the front side 42 of the combustion chamber wall lining part 36 and a short distance from a bulge 46 of the combustion chamber bottom 22.

The glow plug 4 is screwed into the socket 24. The glow plug 4 is connected, via two current conductors not shown, to a control device, not shown, from which the glow plug 4 is supplied with electricity when ignition in the heater is necessary.

The aforementioned bulge 46 of the combustion chamber bottom 22 is designed such that the glow plug 4 can be accommodated in its intended positioning concerning right and left in FIG. 2 and concerning the axial direction of the combustion chamber 2.

The combustion chamber bottom lining part 38 differs from the complete disk shape in that the material is omitted to the left of and above the limiting line 48 shown in FIG. 2, which extends like a leg of a right angle. A recessed space 50 is thus formed, which is approximately cylindrical with a vertical axis and has a sufficient size for accommodating the glow area 44 of the glow plug 4. The recessed space 50 is limited axially in the rear (left-hand part in FIG. 1) and on the outside (left-hand part in FIG. 2) by a bulge of the combustion chamber bottom 22. Axially in the front (right-hand part in FIG. 1), the recessed space 50 is limited by the front side 42 of the combustion chamber wall lining part 36. On the inside (right-hand part in FIG. 2) and at the bottom, the recessed space 50 is limited by the above-described limiting line 48.

Since the vertical part of the limiting line 48 is located farther inside toward the longitudinal axis of the combustion chamber 2 than the area of the inner circumference of the combustion chamber wall lining part 36 located there, an essentially segment-shaped passage opening 52 pointing in the axial direction is formed between the recessed space 50 and the interior of the end area 14 of the combustion chamber 2.

It should be pointed out that as an alternative, the glow plug 4 may also be positioned displaced somewhat farther to the right in FIG. 1, in which case the front side 42 of the combustion chamber wall lining part 36 would have to be somewhat retracted in this area. The recessed space 50 would be formed in this case not only by omitting material of the combustion chamber bottom lining part 38, but additionally also by omitting material on the combustion chamber wall lining part 36.

FIG. 1 also shows an essentially cylindrical attachment 6 on the rear side of the combustion chamber bottom 22. This attachment 6 is laterally offset in relation to the bulge 46, as can be recognized from FIG. 2, in which the attachment 6 is shown, even though it is located in front of the plane of the drawing. At the point of the attachment 6, the combustion chamber bottom 22 has an opening, which cannot be recognized from the drawing. The attachment 6 is filled with metal netting, which joins the metal netting of the combustion chamber bottom lining part 38. A fuel line 54 opens into the interior of the attachment 6. Thus, fuel can be supplied via a fuel pump, not shown, and the line 54 to the metal netting of the combustion chamber bottom lining part 38, from which the fuel evaporates into the interior of the end area 14 of the combustion chamber 2, but also into the recessed space 50. A porous material, e.g., porous ceramic or metal netting, can, but does not have to be selected for the combustion chamber wall lining part 36. Due to capillary action, fuel will also reach in this case the combustion chamber wall lining part 36, from which it evaporates inwardly into the interior of the end area 14 of the combustion chamber 2.

A usually axially extending hole 56 of a relatively small diameter, through which the combustion air needed for the ignition at the glow area 44 of the glow plug 4 can flow into the recess 50, is provided in the bulge 46.

Arrows in FIG. I indicate how the combustion air delivered by the blower 8 flows into the end area 14 through the openings 40 and into the main combustion area 16 of the combustion chamber through the openings 26, and how a small amount of combustion air flows into the recessed space 50 through the hole 56 described in the last paragraph FIG. 2 shows that the passage opening 52 has a size which amounts only to a small percentage of the area of the combustion chamber bottom 22 or of the combustion chamber bottom lining part 38.

While specific embodiments of the invention have been shown and described in detail to illustrate the application of the principles of the invention, it will be understood that the invention may be embodied otherwise without departing from such principles.

We claim:

1. A burner comprising:
    a combustion chamber including a cylindrical wall and an end wall;
    a porous lining material positioned on an inner surface of said end wall and positioned on a portion of said cylindrical wall adjacent said end wall, said lining material defining a recess, said lining material also defining a passage providing communication between said recess and an interior of said combustion chamber;
    fuel supply means for supplying fuel to said porous lining material;
    glow plug means for igniting fuel evaporated from said porous lining material, said glow plug means including a glow area and said glow area being positioned in said recess.

2. A burner in accordance with claim 1, wherein:
    said glow plug means is positioned substantially tangentially with said cylindrical wall.

3. A burner in accordance with claim 1, wherein:
    said lining material includes a first part positioned adjacent said end wall;
    said lining material includes a second part positioned adjacent said cylindrical wall, said second part having an end surface adjoining said first part;
    said recess being formed in said first part of said porous lining material.

4. A burner in accordance with claim 3, wherein:
    said recess is formed by shaping said first part as a disk with a portion of said disk removed.

5. A burner in accordance with claim 3, wherein:
    said passage is positioned adjacent said second part.

6. A burner in accordance with claim 3, wherein:
    said recess is positioned adjacent said second part.

7. A burner in accordance with claim 6, wherein:
    said first part is substantially shaped as a disk with an outer circumferential portion of removed, said outer circumferential portion defining said recess.

8. A burner in accordance with claim 1, wherein:
    said lining material includes a first part positioned adjacent said end wall;
    said lining material includes a second part positioned adjacent said cylindrical wall, said second part having an end surface adjoining said first part;
    said passage being formed in said first part of said porous lining material.

9. A burner in accordance with claim 8, wherein:
    said passage is formed by shaping said first part as a disk with a portion of said disk removed.

10. A burner in accordance with claim 1, wherein:
    said passage is substantially segment shaped in an axial direction of said cylindrical wall.

11. A burner in accordance with claim 1, wherein:
    said glow plug means is a sheathed element glow plug.

12. A burner in accordance with claim 1, wherein:
    said lining includes a part positioned adjacent said end wall and formed of metal netting.

13. A burner in accordance with claim 1, wherein:
    said lining includes a part positioned adjacent said cylindrical wall and formed of ceramic.

14. A burner in accordance with claim 1, wherein:
    blower means is provide for supplying combustion air to said combustion chamber.

15. A burner in accordance with claim 14, wherein:
    said end wall defines an opening in communication with said recess;
    said blower means supplies combustion air through said opening.

16. A burner in accordance with claim 1, wherein:
    said passage has an area 0.5% to 10% of an area of said bottom wall.

17. A burner in accordance with claim 1, wherein:
    said glow plug means is positioned in a plane of said lining material adjacent said end wall.

18. A burner in accordance with claim 1, wherein:
    said lining material includes an end wall part positioned adjacent and parallel said end wall of said combustion chamber;
    said recess being defined by an outer circumferential portion of said end wall part of said lining material.

19. A burner in accordance with claim 1, wherein:
    said lining material includes an end wall part positioned adjacent and parallel said end wall of said combustion chamber;
    said recess being defined by said end wall part of said lining material;
    said glow plug means and said recess being in a plane of said end wall part of said lining material.

20. A burner in accordance with claim 1, wherein:
    said lining material includes an end wall part positioned adjacent and parallel said end wall of said combustion chamber, said lining material also includes a cylindrical part positioned adjacent said cylindrical wall;

said recess being defined by an outer circumferential portion of said end wall part of said lining material;

said glow plug means and said recess being in a plane of said end wall part of said lining material, said glow plug means being positioned tangential to said cylindrical part of said lining material.

* * * * *